United States Patent
Wang

(10) Patent No.: US 6,545,252 B2
(45) Date of Patent: Apr. 8, 2003

(54) ELECTRIC FRYER

(76) Inventor: Dongming Wang, 1-415 Luyuan Building, No. 16, Renmin West Road, Zhuhai City, Guangdong Province 519060 P.R. (CN)

( * ) Notice: Subject to any disclaimer, the term of this patent is extended or adjusted under 35 U.S.C. 154(b) by 0 days.

(21) Appl. No.: 09/876,343

(22) Filed: Jun. 7, 2001

(65) Prior Publication Data

US 2001/0050005 A1 Dec. 13, 2001

(30) Foreign Application Priority Data

Jun. 8, 2000 (CN) .......................... 00228463
Nov. 16, 2000 (CN) .......................... 00240170

(51) Int. Cl.⁷ .............................. A47J 37/10
(52) U.S. Cl. .................. 219/432; 219/430; 219/435; 99/403
(58) Field of Search ................. 219/432, 430, 219/429, 435; 99/403

(56) References Cited

U.S. PATENT DOCUMENTS 5,048,402 A  9/1991 Letournel et al. ............. 99/348

FOREIGN PATENT DOCUMENTS

EP  0 328 432 A1  8/1989
EP  0 705 554 A1  4/1996

OTHER PUBLICATIONS

Search Report as performed on Dec. 11, 2001, by UK Patent Office Examiner E. Tonner as pertaining to GB 0113820.5.

*Primary Examiner*—Joseph Pelham
(74) *Attorney, Agent, or Firm*—Jenkens & Gilchrist, P.C.

(57) ABSTRACT

The invention relates to an electric fryer comprising a body comprising a housing and a container between which an insulating chamber is formed; a lid connected to the upper part of said body; a basket positionable in said container for containing food to be fried; heating means for heating the container; controlling means for controlling a heating time and a heating temperature of the heating means; and a base positioned under the body and connected separately thereto. The electric fryer according to the invention is of a novel structure, ensures safety, and can be easily cleaned and saves power.

11 Claims, 7 Drawing Sheets

ELECTRIC FRYER

FIELD OF THE INVENTION

The invention relates to a household cooker, more particularly to an electric fryer.

BACKGROUND OF THE INVENTION

A conventional electric fryer comprising a power controller, heating elements and a body is of an integral structure. Therefore, it is very inconvenient to clean. Moreover, it is easy for the user to be scalded since no insulating means is provided in the conventional electric fryer to render its outer surface very hot. It is obvious that more power will be consumed to use such an electric fryer.

SUMMARY OF THE INVENTION

An object of the invention is to provide an electric fryer to solve problems in the prior art.

An electric fryer according to the invention comprises:

a body comprising a housing and a container between which an insulating chamber is formed;

a lid connected to the upper part of said body;

a basket positionable in the container for containing food to be fried;

heating means for heating the container;

controlling means for controlling a heating time and a heating temperature of the heating means; and a base positioned under the body and connected separately thereto.

The electric fryer according to the invention can easily be cleaned and save electricity.

DETAILED DESCRIPTION OF THE INVENTION

In the invention, the electric fryer comprises a body comprising a housing and a container between which an insulating chamber is formed; a lid connected to the upper part of said body; a basket positionable in said container for containing food to be fried; heating means for heating the container; controlling means for controlling a heating time and a heating temperature of the heating means; and a base positioned under the body and connected separately thereto.

In one embodiment of the invention, the electric fryer may further comprise a support disposed under the bottom of the electric fryer.

The lid may include an absorbing means in its center for absorbing oil fumes arising from the frying of food, and a exhaust cover open to air.

The insulating chamber in the invention may be a vacuum space or may be filled with insulating materials.

The heating means in the invention may be one or a plurality of electrically heating tubes positioned on the outside surface of the container. The number of the electrically heating tubes depends on the heating temperature or the heating time.

According to the invention, the controlling means may comprise a temperature sensor, a controlling circuit and a controller, all of which are conventional in the art. In one embodiment of the invention, the temperature sensor is fixed on the outer surface of the container, and the controller is a controlling panel on the base. In another embodiment of the invention, the temperature sensor is arranged to contact the outer surface of the container, and the controller is a temperature controller and a timer arranged on the base.

The basket in the invention is put in the container when the food is fried and has a plurality of holes so that oil therein can be drained off when the basket is taken out.

A conventional handle may be used in the electric fryer of the invention. For example the conventional handle may directly be connected to the fringe of the basket to facilitate removing the basket from the container when the food has been fried.

Preferably, the handle of the electric fryer according to the invention comprises a bolt in the shape of L and a spring in a slot, and a sliding lock connected to the bolt on the surface of the handle. The slot is in the shape of ⊦, and the spring is connected to the bolt in the slot. The handle may pivotably be connected to a connection fixed to the fringe of the basket. By turning, the handle can be moved to a vertical or horizontal position. The bolt is pushed into a horizontal lock hole at the end of the connection by the action of the spring when the handle is turned to the horizontal position. To press the spring via the sliding lock, the handle can be turned to the vertical position.

BEST MODE FOR CARRYING OUT THE INVENTION

The invention will be described in details with the following examples in conjunction with the accompanying drawings.

EXAMPLE 1

Figure 1:
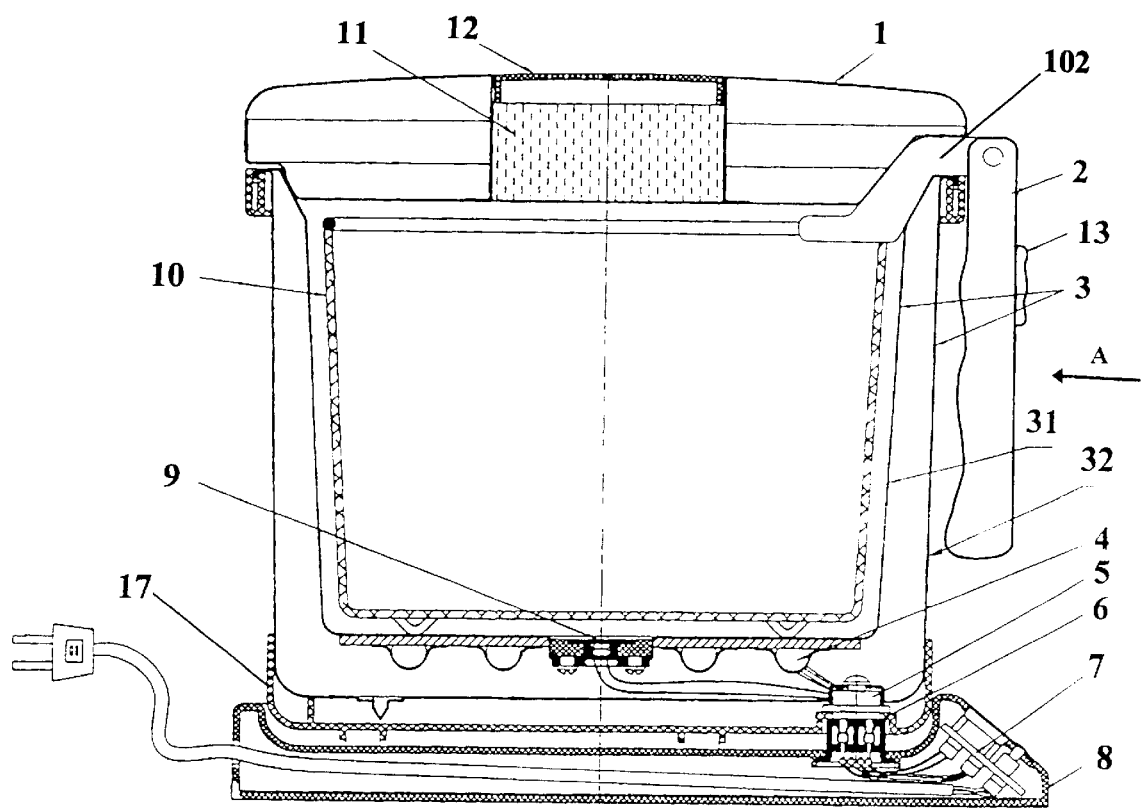
FIG. 1 is a diagram showing an embodiment of the electric fryer in accordance with the present invention.
Figure 5:
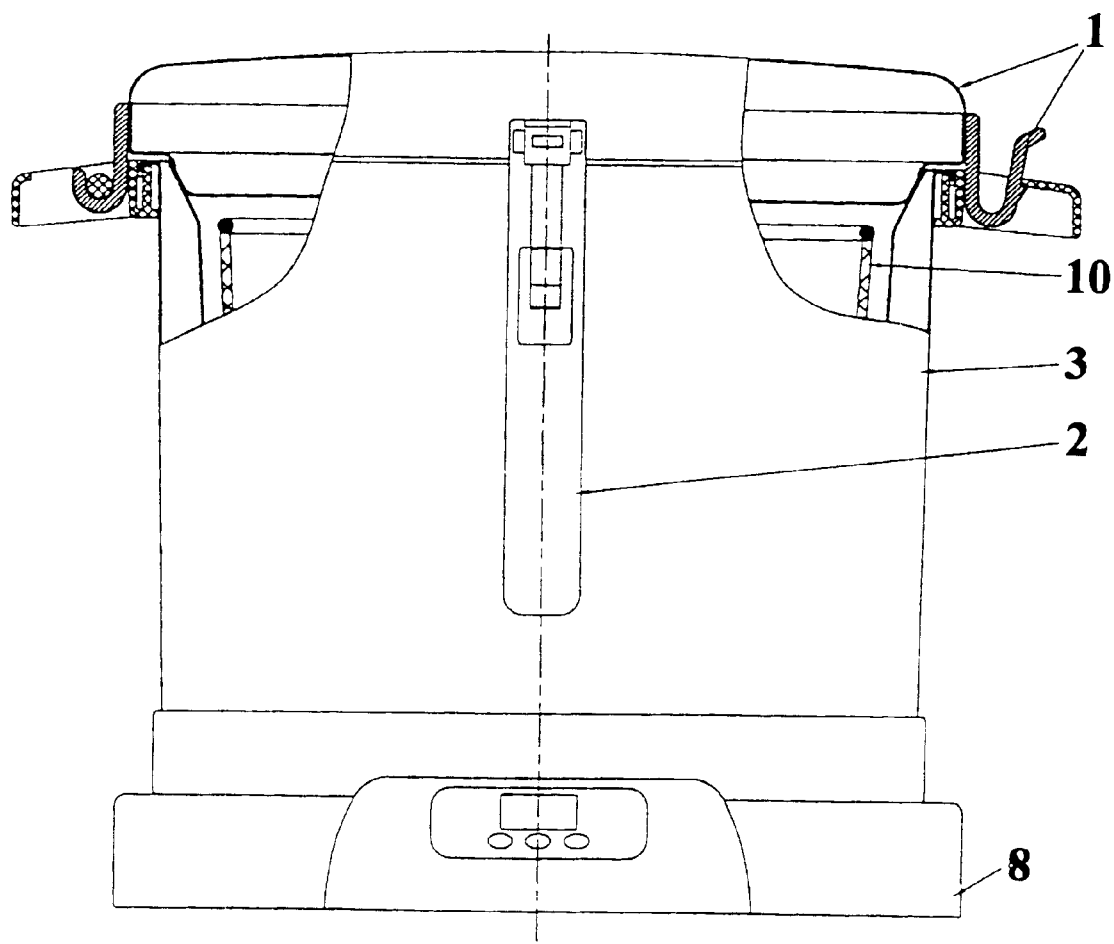
FIG. 5 is a cross sectional view taken along line A—A in FIGS. 1 and 3.

FIGS. 1 and 5 show an electric fryer in accordance with the present invention. A body 3 includes a housing 32 and container 31, and between the housing 32 and the container 31 is formed a vacuum space. A lid 1 is provided on the body 3 and may be fastened to it by a fastener. The lid 1 contains a filtering means for filtering oil from the container. In this embodiment, the absorbing means 11 is an absorbing pad, on which an exhaust cover 12 open to air for exhausting oil fumes arising from the container is disposed.

A basket 10 is disposed in the container 31. Heating means 4 comprising two circular electrically heating tubes is arranged on the bottom of the container 31 to heat it. Controlling means comprising a temperature sensor 9, a circuit (not shown) and a controlling panel 7 on a base 8 is used for controlling the heating power and the heating time of the heating tubes. The temperature sensor 9 is disposed on the outer surface of the container 31. The base 8 is disposed under the bottom of the body 3 and connected thereto releasably. In this embodiment, the electric fryer also comprises a support 17.

Figure 7:
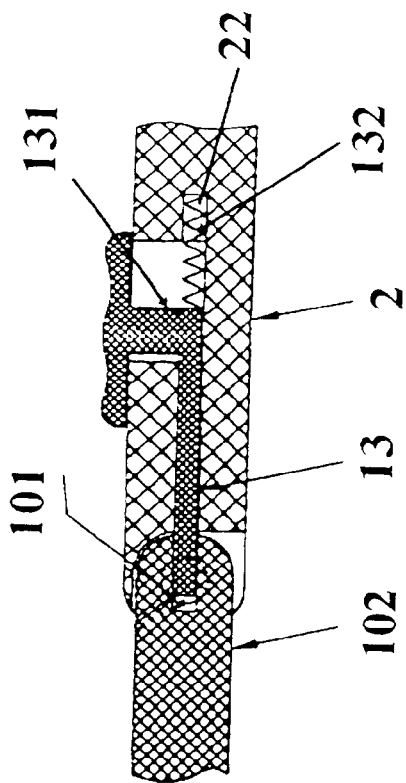
FIG. 7 is a diagram of one embodiment of the handle in accordance with the invention when it is in the vertical direction.
Figure 8:
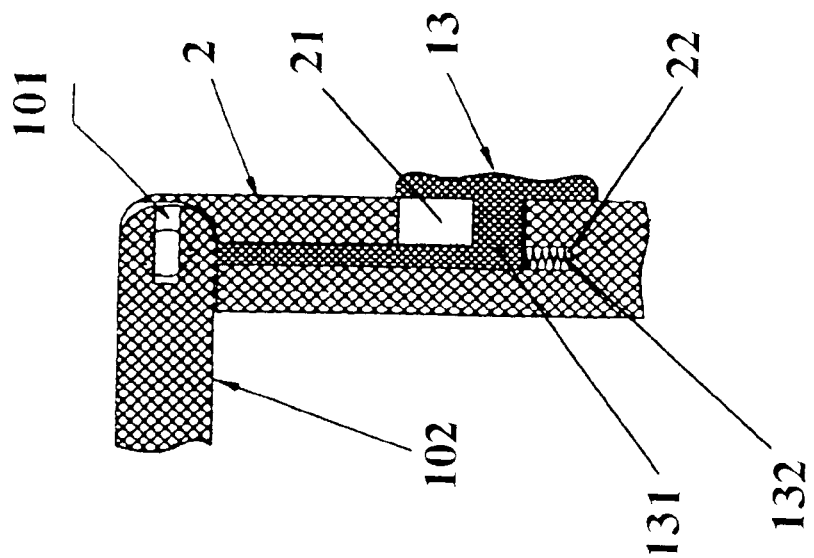
FIG. 8 is a diagram of on embodiment of the handle in accordance with the invention when it is in the horizontal direction.

As shown in FIGS. 7 and 8, the handle 2 comprises a bolt 131 in the shape of L and a spring 132 in a slot 21, and a sliding lock 13 connected to the bolt 131 on the surface of the handle 2. The handle 2 may be pivotally connected to a connection 102 which is fixed to the fringe of the basket. The slot 21 is in the shape of ⌊, and the spring 132 is connected to the bolt 131 in the slot 21. By turning, the handle 2 can be moved to a vertical or horizontal position. The bolt 131 is pushed into a horizontal lock hole 101 at the end of the connection 102 by the action of the spring 132 when the handle 2 is turned to the horizontal position. To press the spring 132 via the sliding lock 13, the handle 2 can be turned to the vertical position.

A plug 5 is disposed on the support 17. One of its ends is connected to the heating means 4 by a lead and the other end is inserted into a socket 6 set on the base 8.

When the body 3 together with the support 17 is put on the base 8, the plug 5 is inserted into the socket 6. Thus, the container is heated. After food is adequately fried, the power is switched off, or the body 3 may be removed from the base 8.

EXAMPLE 2

Figure 2:
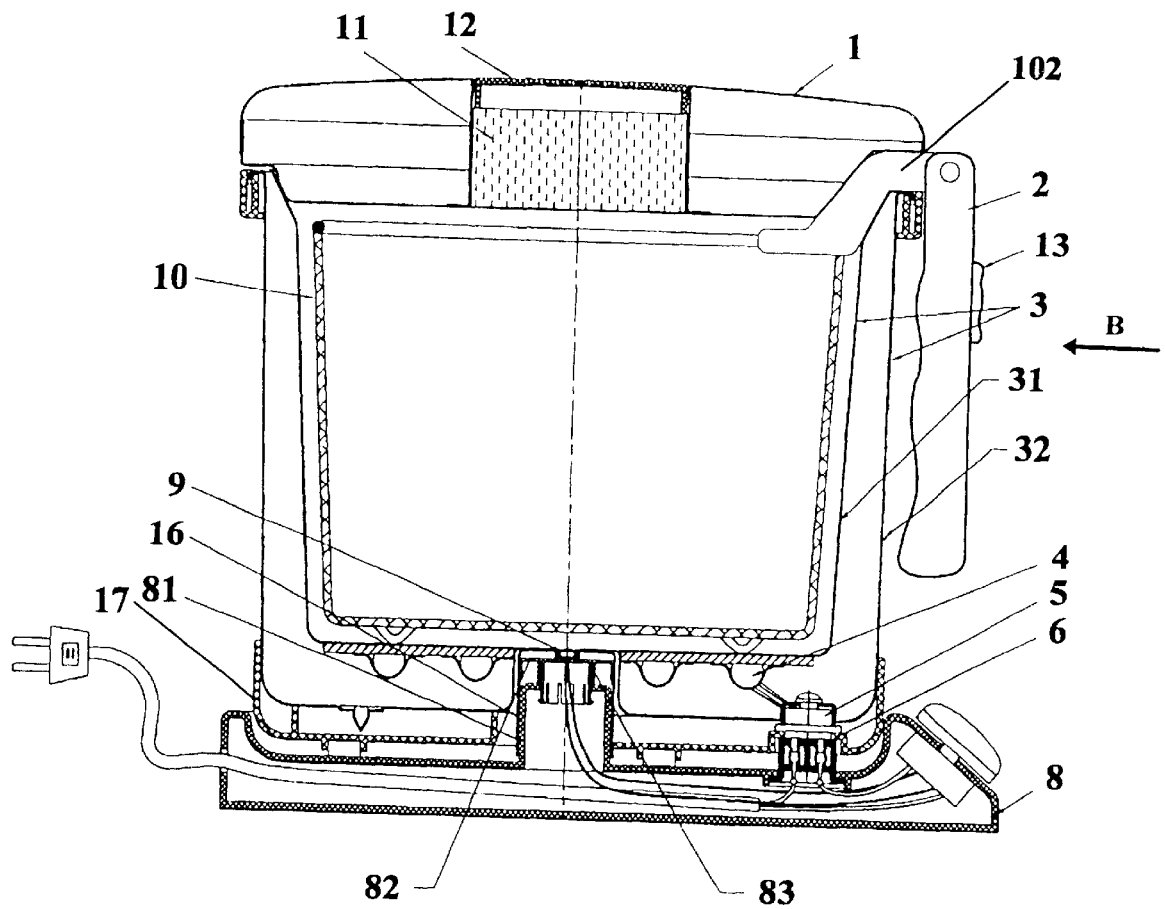
FIG. 2 is a diagram showing another embodiment of the electric fryer in accordance with the present invention.
Figure 6:
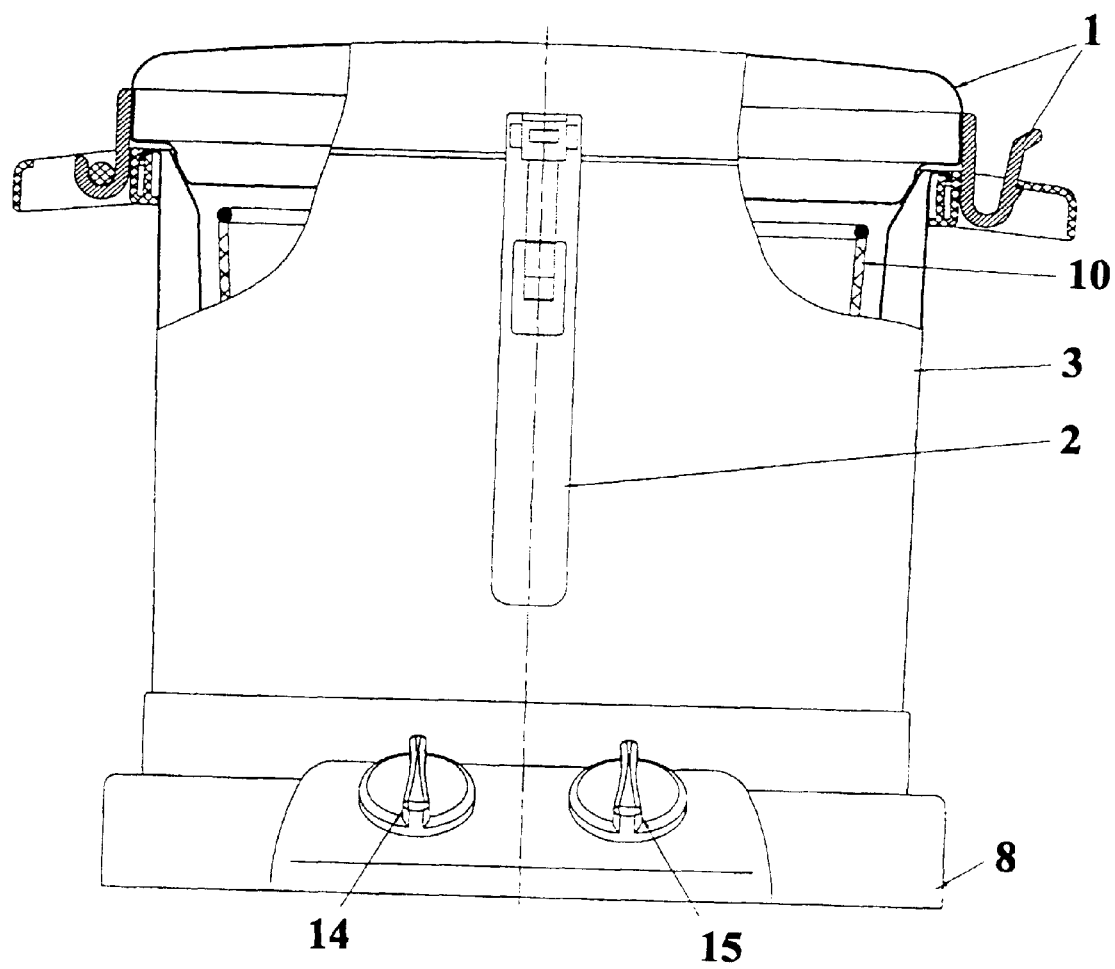
FIG. 6 is a cross sectional view taken along line B—B in FIGS. 2 and 4.

FIGS. 2 and 6 show another electric fryer in accordance with the present invention. In the embodiment, heating means 4 comprising two circular electrically heating tubes is fixed and exposed on the outer surface of the bottom of the container 31. The temperature sensor 9 is fitted in the inner surface of a casing 16, which is put on a projection 81 on the base 8. The casing 16 contacts the outer surface of the container 31. A spring 83 is disposed between a separator 82 in the casing 16 and the projection 81 to keep the casing 16 in close contact with the outer surface of the container 31.

A timer 14 and a temperature controller 15 connected to the socket 6 are arranged on the base 8. Other elements in the embodiment are the same as those in Example 1.

EXAMPLE 3

Figure 3:
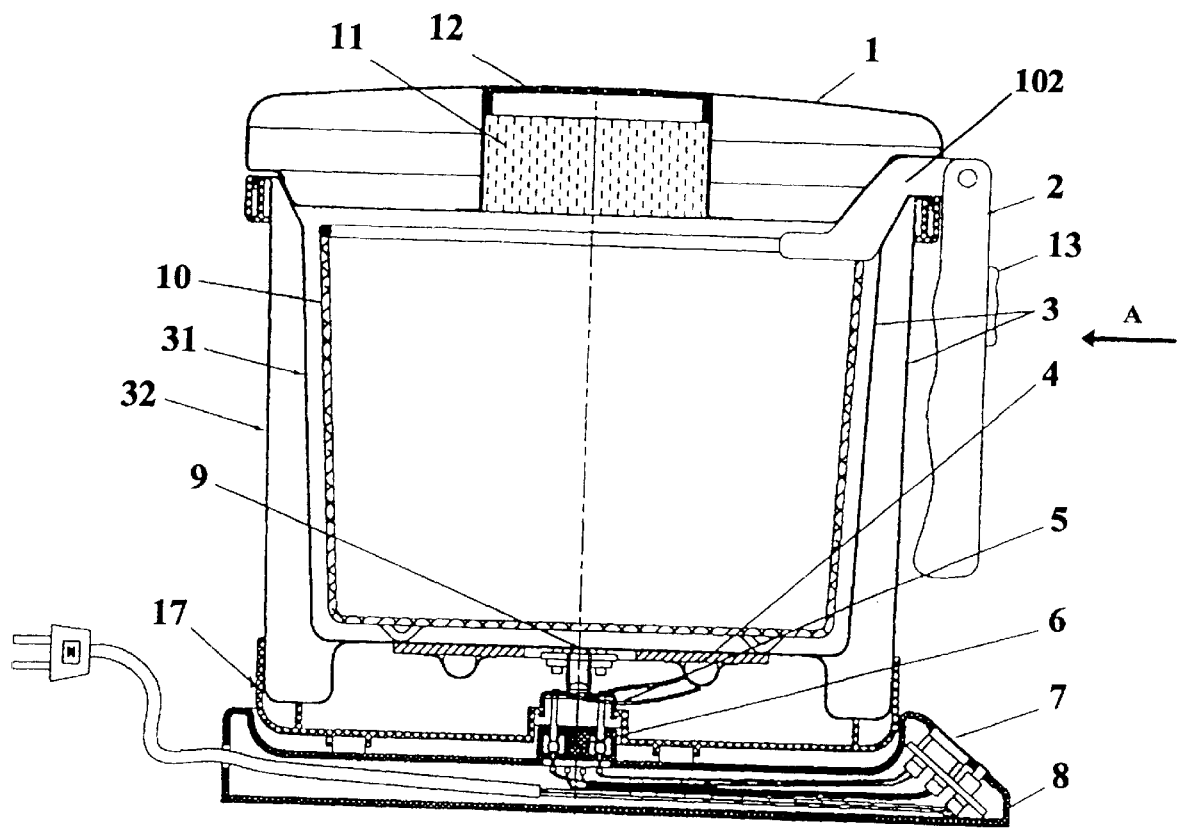
FIG. 3 is a diagram showing another embodiment of the electric fryer in accordance with the present invention.

FIGS. 3 and 5 show another electric fryer in accordance with the present invention. The body 3 comprises the housing 32 and the container 31 between which is formed an insulating chamber. Heating means 4 is a circular heating tube disposed on the outer surface of the bottom of the container, which is enclosed and sealed by the support 17 at the bottom of the base 3. The temperature sensor 9 is set on the outer surface of the container 31. The controlling panel 7 is arranged on the base 8.

Other elements of the electric fryer in this Example are the same as those in Example 1.

EXAMPLE 4

Figure 4:
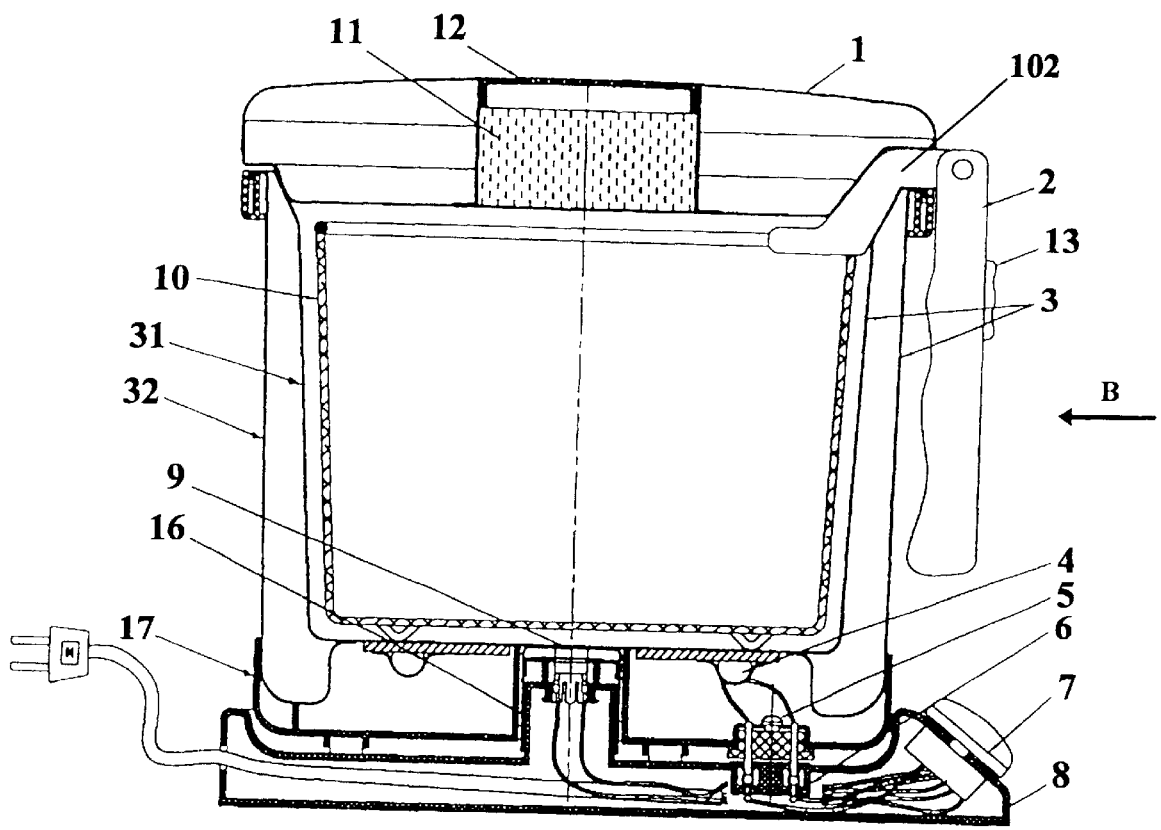
FIG. 4 is a diagram showing another embodiment of the electric fryer in accordance with the present invention.

FIGS. 4 and 6 show another electric fryer in accordance with the present invention. The body 3 comprises the housing 32 and the container 31 between which is formed an insulating chamber. Heating means 4 is a circular heating tube disposed on the outer surface of the bottom of the container, which is enclosed and sealed by the support 17 at the bottom of the base 3. The temperature sensor 9 is set on the outer surface of the container 31. The controlling panel 7 is arranged on the base 8.

Other elements of the electric fryer in this Example are the same as those in Example 2.

The electric fryer in the invention is of a novel structure and ensures safety. It can be easily cleaned and saves power.

What is claimed:

1. An electric fryer comprising:
   a body comprising a housing having a bottom and a recess, and a container disposed in said recess of said housing and formed with an accommodation space and an opening for said accommodation space as well as having an inner surface on a side thereof faced on said accommodation space and an outer surface on another side thereof opposed to said side;
   a lid for covering said opening of said container;
   a basket disposed in said accommodation space of said container;
   a heating device disposed on said outer surface of said container;
   a support on which the bottom of the body is disposed; and
   wherein a heat-insulation chamber is formed between said housing and said outer surface of said container.

2. The electric fryer according to claim 1, wherein said lid contains absorbing means for absorbing oil fumes exiting from the container.

3. The electric fryer according to claim 1, wherein said insulating chamber is substantially in a vacuum state.

4. The electric fryer according to 1, wherein said heating device comprises a plurality of electrically heating tubes.

5. The electric fryer according to claim 1, wherein said fryer further comprises a controlling unit, the controlling unit comprising:
   a temperature sensor positioned on the outer surface of the container; and
   a temperature controller mounted on said body and connected to the temperature sensor and heating device.

6. The electric fryer according to claim 5, wherein said temperature sensor is movable.

7. The electric fryer according to claim 1, wherein said electric fryer further comprises a handle and a connection between said handle and said basket.

8. The electric fryer according to claim 7, wherein said handle is pivotally connected to said connection and said connection is fixed to the fringe of the basket.

9. The electric fryer according to claim 8, wherein said handle comprises a bolt formed in the shape of L and a spring disposed in a slot formed in said handle, and a sliding locking element connected to said bolt on the surface of the handle, wherein the spring is connected to the bolt in the slot, and said bolt is inserted into a horizontal lock hole at the end of the connection when the handle is turned to the horizontal position.

10. An electric fryer comprising:
    a body comprising a housing and a container between which an insulating chamber is formed;
    a lid connected to the upper part of said body;
    a basket positional in said container for containing food to be fried;
    heating means for heating said container;
    controlling means for controlling a heating time and a heating temperature of said heating means;
    a base positioned under said body and connected separately thereto; and
    a support under the bottom of said body.

11. An electric fryer comprising:

a body comprising a housing and a container between which an insulating chamber is formed;

a lid connected to the upper part of said body;

a basket positional in said container for containing food to be fried;

heating means for heating said container;

controlling means for controlling a heating time and a heating temperature of said heating means;

a connection between a handle and said basket, wherein said handle is pivotally connected to said connection and said connection is fixed to said basket, wherein said handle further comprises a bolt formed in the shape of L and a spring disposed in a slot formed in said handle, and a sliding lock connected to said bolt on the surface of said handle, wherein the spring is connected to the bolt in the slot, and said bolt is inserted into a horizontal lock hole at the end of the connection when the handle is turned to the horizontal position; and a base positioned under said body and connected separately thereto.

* * * * *

UNITED STATES PATENT AND TRADEMARK OFFICE
CERTIFICATE OF CORRECTION

PATENT NO. : 6,545,252 B2
DATED : April 8, 2003
INVENTOR(S) : Dongming Wang

It is certified that error appears in the above-identified patent and that said Letters Patent is hereby corrected as shown below:

<u>Column 1,</u>
Line 54, delete "diagram of on embodiment" replace with -- diagram of one embodiment --

Signed and Sealed this

Twenty-sixth Day of August, 2003

JAMES E. ROGAN
*Director of the United States Patent and Trademark Office*